United States Patent

[11] 3,576,437

[72] Inventor Eugene F. Peron
 2024 Maycrest Ave., South Pasadena, Calif. 91030
[21] Appl. No. 718,470
[22] Filed Apr. 3, 1968
[45] Patented Apr. 27, 1971

[54] PORTABLE SPOTLIGHT
 1 Claim, 5 Drawing Figs.
[52] U.S. Cl. ................................. 240/7.1R,
 240/8.18, 240/52.1, 240/73, 248/220.5, 248/223
[51] Int. Cl. .................................. B60q 1/24,
 F21m 3/00, F21v 21/08
[50] Field of Search ......................... 240/7.1,
 8.18, 52, 52.1, 73 (QD); 248/220.5, 243

[56] References Cited
 UNITED STATES PATENTS

| | | | |
|---|---|---|---|
| 2,140,855 | 12/1938 | Scott | 240/7.1 |
| 1,082,079 | 12/1913 | Goff | 240/8.18 |
| 1,158,578 | 11/1915 | Stearns | 240/8.18X |
| 1,498,534 | 6/1924 | Anderson et al. | 240/8.18X |
| 1,767,373 | 6/1930 | Kirlin | 240/52X |
| 2,773,973 | 12/1956 | Hoard et al. | 240/4 |
| 3,008,039 | 11/1961 | Baldwin | 240/52.1X |
| 3,322,944 | 5/1967 | Mellyn | 240/8.18 |
| 2,688,289 | 9/1954 | Sterling | 105/369 |

Primary Examiner—Samuel S. Matthews
Assistant Examiner—Kenneth C. Hutchinson
Attorney—Christie, Parker and Hale ABSTRACT: A portable spotlight adapted for use as a spotlight inside a motor vehicle employed by law enforcement officers and being constructed for storage in a compartment when not in use. The spotlight is provided with a plug adapted to be connected into the cigarette lighter socket for the light to be electrically powered therefrom. The spotlight has an outwardly extending mounting post with a locking pin mounted adjacent the end opposite from the end mounting the spotlight and extending transversely to the longitudinal axis of the mounting post. A compression spring is seated on the mounting post for securely holding the spotlight in a preselected locked position. The spotlight coacts with a mounting plate located above the windshield and having apertures for receiving the mounting post and locking pin therethrough and readily rotatable into and out of locking position. The mounting post is releasably maintained in locked position through the compressive action of the compression spring.

Patented April 27, 1971

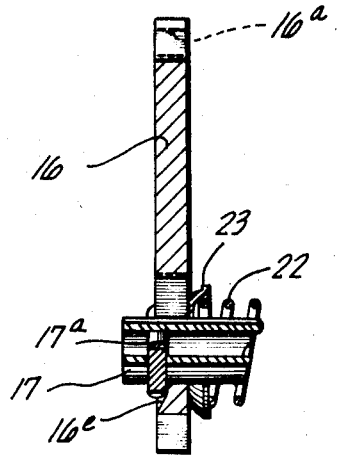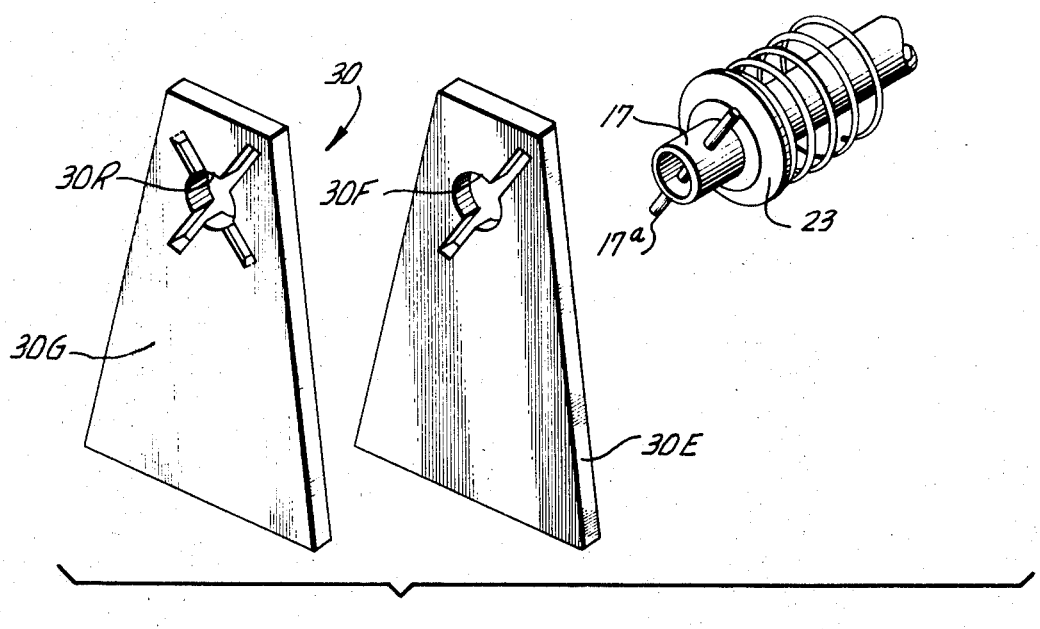

PORTABLE SPOTLIGHT

This invention relates to a portable spotlight for use with a motor vehicle and more particularly to a portable spotlight for use in law enforcement motor vehicles.

Spotlights are presently employed on motor vehicles and are mounted both interiorly and exteriorly of the driving compartment of the vehicle. Motor vehicles equipped with spotlights are employed by law enforcement officers in the conduct of their investigative activities and traffic control operations. These spotlights are generally designed to provide a high intensity, narrow beam for illuminating a specific area or object. The law enforcement vehicles include what is commonly known as an undercover vehicle. It is preferable that the undercover vehicle appear no different than a conventional motor vehicle used for business or pleasure.

The undercover vehicles at the present time include spotlights that are mounted interiorly thereof for use by the law enforcement officer to cause the beam of the spotlight to project through the front windshield, for example. These spotlights are generally mounted on the motor vehicle proper and, although the vehicle itself may not give the appearance of a vehicle belonging to a law enforcement officer or governmental agency, the mere presence of the spotlight within the vehicle renders it suspicious or "different." Accordingly, a portable spotlight is desired that may be quickly mounted into position for use by an operator and moved out of sight when not in use so that the vehicle will appear as any other conventional motor vehicle.

The present invention provides an improved inexpensive and relatively simple portable spotlight that is particularly adapted for use by law enforcement officers and especially adaptable for undercover vehicles. The spotlight of the present invention may be stored in the glove compartment of the motor vehicle and thereby out of sight and yet readily mounted into position to allow the spotlight to be operated by the law enforcement officer or user. The motor vehicle may be adapted with a spotlight mounting member secured thereto and preferably secured behind the conventional sun visor of the motor vehicle so that it is out of sight when the spotlight is not in use. The spotlight per se may be of conventional construction and one that may be energized from the conventional cigarette lighter socket.

Structurally, the portable spotlight of the present invention comprises a spotlight having an outwardly extending mounting post that is adapted to be removably mounted to a preselected location within the motor vehicle and adapted to be energized from the cigarette lighter receptacle of the vehicle. The spotlight includes means mounted inside the vehicle for removably mounting a spotlight and allowing it to be visible outside of the vehicle and yet rotatable for illuminating various areas either through the front windshield or the back windshield of the vehicle. Specifically, the portable spotlight may comprise a mounting post constructed and defined at its outer end to be readily connected and disconnected to a mounting member and which construction may be a bayonetlike type construction for securing the mounting post of the spotlight to a mounting member when the two are interconnected. The mounting post may further carry means for securing and locking the post to the mounting member to allow the spotlight to be used as required.

These and other features of the present invention may be more fully appreciated when considered in the light of the following specification and drawings, in which:

FIG. 4 is a cross-sectional view taken along the line 4—4 of FIG. 3; and

FIG. 5 is an exploded view of another mounting member showing the interrelationship of the mounting member and the connectable end of the portable spotlight of the present invention.

Figure 1:
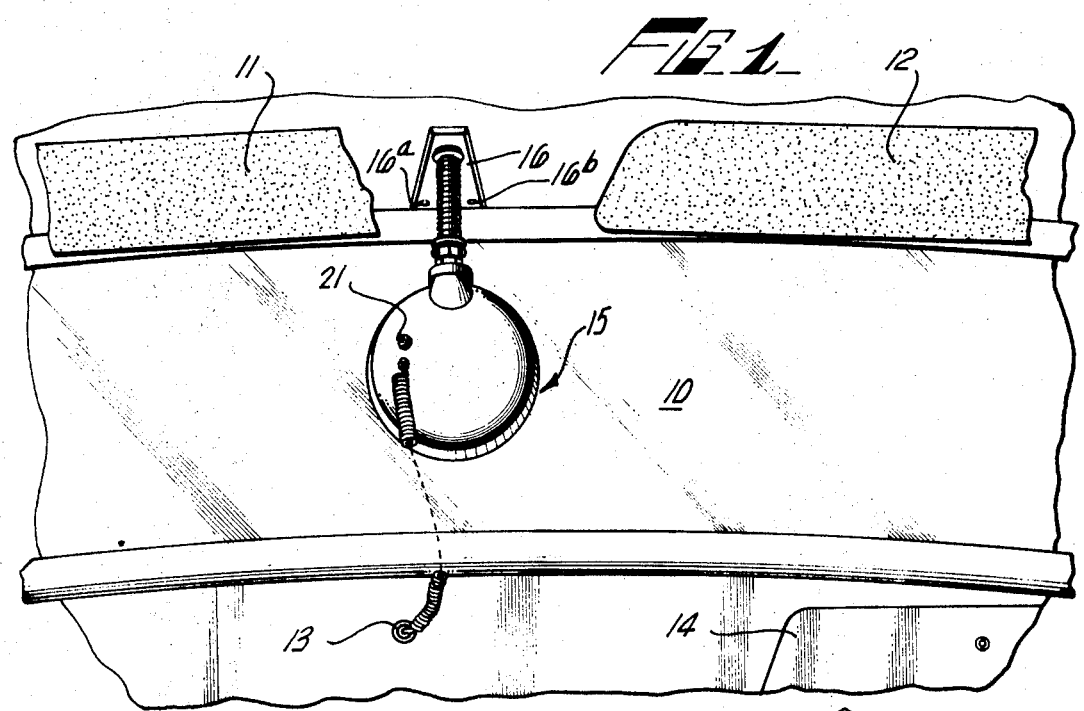
FIG. 1 is a schematic illustration of a portion of the interior of a motor vehicle showing the portable spotlight of the present invention mounted in an operable relationship.
Figure 2:
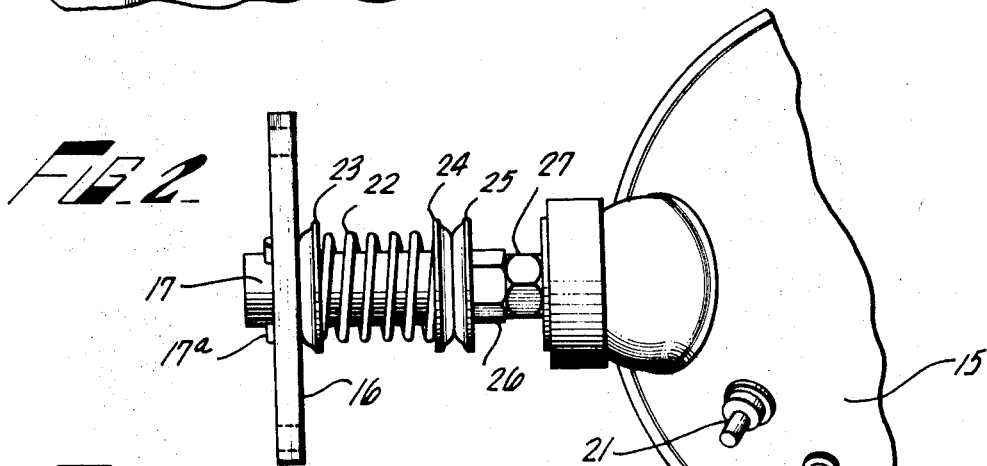
FIG. 2 is a partial side elevational view of the portable spotlight of the present invention showing a detached mounting member secured thereto.

Referring to FIG. 1, the general organization of the present invention as it relates to the interior of a motor vehicle as viewed from the front seat thereof will be examined. To this end, the front windshield 10 is shown with the sun visors 11 and 12 movably mounted thereover. In addition, the conventional dashboard is illustrated with the cigarette lighter socket 13 mounted thereon. On the right-hand side of the dashboard there is illustrated a glove compartment exemplified by the closure member 14 illustrated in a closed position. The portable spotlight 15 of the present invention is illustrated in a mounted relationship with a mounting member 16 secured behind the sun visor 11. The spotlight 15 is further illustrated electrically connected to the cigarette lighter socket 13 and is arranged in an operative relationship to cause the beam from the spotlight 15 to be projected through the front windshield 10. The spotlight 15 is readily disconnected or snapped from the mounting member 16 and the cigarette lighter socket 13 so that it can be stored inside the glove compartment and thereby out of sight. With the positioning of the sun visor 11, then, over the mounting member 16, the interior of the motor vehicle will appear as any other conventional passenger car particularly when viewed or examined exteriorly of the vehicle. The importance of this is that such conventional appearing motor vehicles may be adapted for using the portable spotlight of the present invention for undercover purposes without any evidence that the vehicle is being employed for law enforcement purposes or the like.

The basic construction of the spotlight per se employed for the present invention is of a commercially available construction and the details of the energizable lamp and the like will not be considered. The spotlight 15 is commercially available with a protruding mounting post 17. The electrical energizing means for the lamp 15 is of conventional construction and comprises electrical conduit means 18 having a conventional electrical cigarette lighter type socket 20 for insertion in lieu of the cigarette lighter in the receptacle 13. The spotlight 15 may also have a conventional manually operated "on" and "off" switch 21 mounted thereto as illustrated. The mounting post 17 is constructed and defined relative to the mounting member 16 to be removably locked thereto to allow the spotlight 15 to be held in a relatively rigid relationship when secured to the mounting member 16. For this purpose, the mounting post 17 is designed with a bayonetlike terminal comprising a laterally extending pin $17^a$ arranged adjacent the free end of the post 17. To maintain the desired interlocked relationship between the mounting member 16 and the mounting post 17, the mounting post carries the means for securing and locking the two together when interconnected. The locking means comprises a compression spring 22 mounted between a pair of seating cups 23 and 24 arranged at the opposite ends of the spring 22 and carried by the post 17. A further seating cup 25 arranged interiorly of the cup 24 is mounted on the post and spaced thereon by means of the conventional fasteners 26 and 27 arranged at the interior end of the post 17. The fasteners 26 and 27 may be positioned on the post 17 to control the compressive urging of the spring 22 through said securing means. It will be appreciated that when the spotlight 15 is not mounted to the mounting member 16 that the seating element 23 is positioned against the locking pin $17^a$ as a result of the compressive urging provided by the spring 22.

Figure 3:
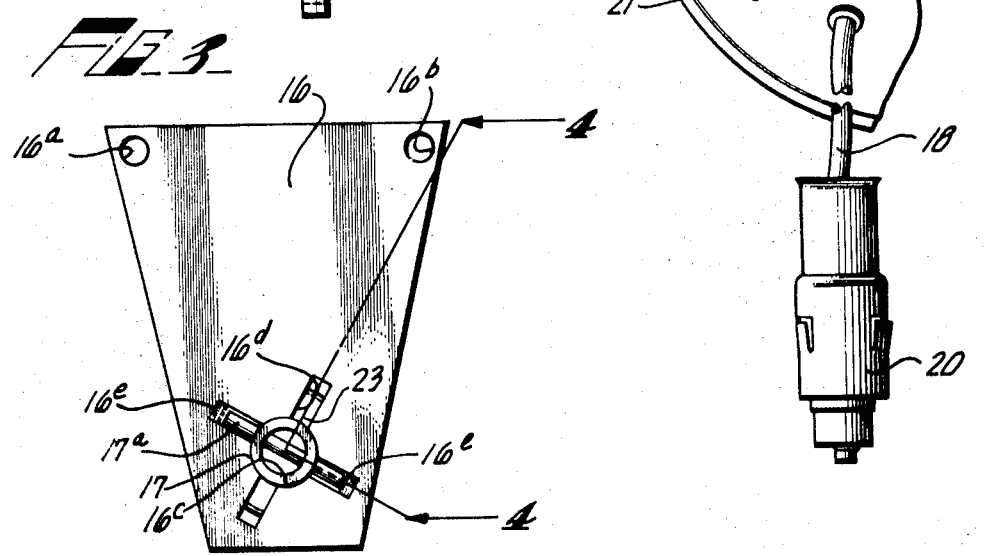
FIG. 3 is a left-hand end view of the mounting member of the assembly of FIG. 2.

The mounting member 16 can be best appreciated from examining FIGS. 3 and 4. The mounting member 16 may be a plate provided with a pair of mounting apertures $16^a$ and $16^b$ for securing the spotlight 15 by means of conventional fasteners over the windshield 10, as illustrated in FIG. 1. The plate 16, however, may be secured in an operative relationship in any conventional fashion. The construction and definition of the mounting member 16 for receiving the mounting post 17 is such that a mounting post receiving aperture $16^c$ is provided and having a circular configuration with radially extending slots 16$^d$ to receive and pass therethrough the mounting pins 17$^a$. On the side of the mounting plate 16 opposite to the mounting post entry side there is provided the mounting slot 16$^e$ arranged orthogonally with respect to the slot 16$^d$. The slots 16$^e$, however, do not extend completely through the member 16 but are merely of a sufficient depth to receive and secure the pin 17$^a$ thereto.

With the above construction in mind, then, the method of interlocking the mounting post 17 to the mounting member 16 should be evident. When the operator of the motor vehicle or the law enforcement officer desires to use the spotlight 15, he need merely remove the light from the glove compartment or from some similar storage location and move the sun visor 11 to a position to expose the mounting member 16. The mounting post 17 is then aligned with the mounting aperture 16$^c$ for the mounting plate 16 to allow the mounting post and the pin 17$^a$ in particular to be passed therethrough to abut the opposite face of the mounting plate 16. Upon rotation of the mounting post 17 a quarter of a turn, the mounting pin 17$^a$ will be aligned and be received within the securing slot 16$^e$. As a result of the compressive action of the spring 22, this interlocked relationship will be maintained. It should also be noted that when the spotlight 15 is mounted in this fashion that the lamp is oriented so that the beam therefrom passes directly through the front windshield 10 onto the selected spot or image. After positioning the spotlight 15 in this fashion, connector 20 will be inserted into the cigarette lighter receptacle 13 for energizing the lamp which may be controlled by means of the "on-off" switch 21. It should also be evident that with this mounting of the lamp that it may be rotated 180° so that the beam from the spotlight 15 is directed through the back windshield (not shown). Such illumination is advantageous for traffic control vehicles that are stopped on a highway or freeway to signal their position.

Another embodiment of the mounting plate 16 is illustrated in FIG 5. The general construction of the mounting plate 30 illustrated in FIG. 5 is similar to the mounting plate 16 except that it is constructed in two pieces. The two-piece construction is provided to give a better holding action for the mounting post 17 of the spotlight 15. For this purpose, an entry mounting plate 30$^e$ is provided with a receiving aperture 30$^f$ having the same configuration as the aperture 16$^d$ to receive and pass the locking pin 17$^a$ of the mounting post 17. The second plate is identified by the reference numeral 30$^g$ and is provided with a similar mounting aperture 30$^r$ arranged in alignment with the aperture 30$^f$ for the plate 30$^e$. This aperture 30$^r$ is the same general configuration as that described for the mounting plate 16. It should be appreciated that with the securing of the plates 30$^e$ and 30$^g$ in a side-by-side relationship, that the locking action relative to the mounting pin 17 is identical to that described in the previous embodiment.

I claim:

1. A portable spotlight adapted for use as a spotlight inside of a motor vehicle employed by law enforcement officers as an undercover vehicle, the vehicle having a windshield, a cigarette lighter adjacent the windshield and a storage compartment, the spotlight being constructed and defined for storage in the compartment when not in use, the spotlight comprising an energizable spotlight having an outwardly extending mounting post, the spotlight including electrical means adapted to be connected into the cigarette lighter socket to be electrically powered therefrom, the mounting post being constructed and defined for securely locking the spotlight adjacent to the windshield for illumination in a direction related to the windshield in a nonpermanent relationship, the mounting post having locking means comprising a locking pin mounted adjacent an end of the mounting post opposite from the end mounting the spotlight and extending transversely to the longitudinal axis of the mounting post and compression spring means seated thereon for securely holding the spotlight in a preselected locked position when the locking means is placed in a locked position through the urging of the compression spring means including when the vehicle is traveling at high speeds yet allowing the spotlight to be rotated in its locked position or completely unlocked therefrom, the mounting post further carrying seating means for the spring and securing means for securing the spring between the seating means in yieldable abutting relationship with the locking pin and for controlling the compressive urging of the spring through said securing means, and a flat mounting plate adapted to be secured behind the sun visor over the windshield of the motor vehicle and adapted to secure the locking pin therein, the mounting plate having a first aperture for receiving the end of the mounting post therethrough and a second aperture communicating with the first aperture for receiving the transverse locking pin therethrough and upon rotation of the pin out of alignment with the second aperture when positioned therein causing the interengagement of the pin and mounting plate thereby locking the pin to the mounting plate and maintained in locked position in response to the compressive action of said spring acting through said seating means engaging the opposite side of the mounting plate from the locking pin and yet readily released from the mounting plate upon rotation of the mounting post to position the pin into alignment with the second aperture of the plate.